(12) United States Patent
Hardzinski

(10) Patent No.: US 8,745,983 B2
(45) Date of Patent: Jun. 10, 2014

(54) HYDRAULIC FLUID COOLING SYSTEM FOR PAIR OF INTEGRATED HYDROSTATIC TRANSMISSIONS WITH AUXILIARY HYDRAULIC CIRCUIT

(75) Inventor: James E. Hardzinski, Matthews, NC (US)

(73) Assignee: Deere & Company, Moline, IL (US)

( * ) Notice: Subject to any disclaimer, the term of this patent is extended or adjusted under 35 U.S.C. 154(b) by 1136 days.

(21) Appl. No.: 12/683,130

(22) Filed: Jan. 6, 2010

(65) Prior Publication Data

US 2011/0162355 A1    Jul. 7, 2011

(51) Int. Cl.
*F15B 7/00* (2006.01)
*F16H 39/04* (2006.01)
*F16H 57/04* (2010.01)

(52) U.S. Cl.
USPC .................. 60/456; 60/464; 60/484; 60/488

(58) Field of Classification Search
USPC ................................ 60/456, 464, 484, 488
See application file for complete search history.

(56) References Cited

U.S. PATENT DOCUMENTS

| | | | |
|---|---|---|---|
| 3,659,419 A * | 5/1972 | Ikeda | 60/484 |
| 4,322,086 A | 3/1982 | Bennink | |
| 4,987,796 A | 1/1991 | von Kaler et al. | |
| 5,001,901 A * | 3/1991 | Erickson et al. | 60/488 |
| 5,622,051 A | 4/1997 | Iida et al. | |
| 5,819,535 A * | 10/1998 | Smothers et al. | 60/488 |
| 6,073,443 A * | 6/2000 | Okada et al. | 60/456 |
| 6,341,489 B1 | 1/2002 | Iida | |
| 6,830,116 B2 | 12/2004 | Ishimaru et al. | |
| 7,654,083 B2 * | 2/2010 | Iida et al. | 60/456 |
| 8,336,306 B2 * | 12/2012 | Hardzinski et al. | 60/488 |
| 2008/0120974 A1 | 5/2008 | Dong et al. | |
| 2008/0310972 A1 | 12/2008 | Dong et al. | |

* cited by examiner

*Primary Examiner* — F. Daniel Lopez

(57) ABSTRACT

A hydraulic fluid cooling system for a pair of integrated hydrostatic transmissions includes a common reservoir holding hydraulic fluid and having hydraulic lines connecting the common reservoir to each integrated hydrostatic transmission, a hydraulic fluid reservoir inside each integrated hydrostatic transmission, and a pump for pumping fluid from each transmission's hydraulic fluid reservoir to the other transmission. An auxiliary hydraulic circuit is between the pair of integrated hydrostatic transmissions. The system pumps hydraulic fluid from one of the integrated hydrostatic transmission to the auxiliary hydraulic circuit, and the return line from the auxiliary hydraulic circuit may be connected to the other integrated hydrostatic transmission.

7 Claims, 6 Drawing Sheets

HYDRAULIC FLUID COOLING SYSTEM FOR PAIR OF INTEGRATED HYDROSTATIC TRANSMISSIONS WITH AUXILIARY HYDRAULIC CIRCUIT

FIELD OF THE INVENTION

This invention relates to hydraulic fluid cooling systems for integrated hydrostatic transmissions, and specifically to hydraulic fluid cooling systems for a pair of individual integrated hydrostatic transmissions on zero turn radius ("ZTR") mowers. This invention also relates to auxiliary hydraulic circuits on such mowers.

BACKGROUND OF THE INVENTION

Grass mowing machines known as zero turning radius ("ZTR") mowers have independently powered drive wheels on each side of a frame. One drive wheel may be operated in a forward direction while the other drive wheel may be stopped or operated in reverse. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Some ZTR mowers include a pair of individual integrated hydrostatic transmissions, each integrated hydrostatic transmission having a variable displacement pump and an independent wheel motor. Advantages of a pair of individual integrated hydrostatic transmissions include flexibility in the width of the mowing vehicle, and freeing up center space between the pair of transmissions.

In the past, each integrated hydrostatic transmission has included its own hydraulic fluid reservoir system. However, when a ZTR mower operates on a side slope, the fluid used in the integrated hydrostatic transmission for the downhill working drive wheel will increase in temperature significantly. Under those circumstances, the hydraulic fluid temperature for the downhill transmission may climb beyond the allowable fluid temperature.

One approach to reduce the hydraulic fluid temperature is to provide a hydraulic fluid cooler to provide extra cooling for each integrated hydrostatic transmission. However, the cooler and additional hydraulic lines can increase the cost of each integrated hydrostatic transmission significantly, and also may become plugged by debris in the mowing environment.

Alternatively, the surface area of an integrated hydrostatic transmission housing can be increased to help dissipate the heat and reduce the fluid temperature. An air flow device such as a fan also can increase the cooling capacity. However, this alternative is limited by cost and space constraints on a ZTR mower, and does not increase cooling capacity sufficiently under severe conditions.

Some ZTR mowers may include auxiliary hydraulic circuits such as electro-hydraulic lift systems used to raise the mower deck. Auxiliary hydraulic circuits may be costly to install during or after manufacture and assembly of the mower. There is a need for a less costly lift system that can be more readily installed. There also is a need for higher lift capacity and better durability than is provided by electro hydraulic lift systems.

SUMMARY OF THE INVENTION

A hydraulic fluid cooling system for a pair of integrated hydrostatic transmissions includes fluid lines connecting between the pair of integrated hydrostatic transmissions. A pump may urge hydraulic fluid through the fluid lines from each integrated hydrostatic transmission to the other integrated hydrostatic transmission. The pump may be a remote pump, such as an electric pump, or a charge pump in each integrated hydrostatic transmission. The system also may include a common reservoir holding hydraulic fluid for both integrated hydrostatic transmissions.

The hydraulic fluid cooling system can send hydraulic fluid from the sump or reservoir of each integrated hydrostatic transmission to the other transmission, providing the cooling capacity of a non-loaded transmission to cool hydraulic fluid for a fully loaded transmission. The system does not require use of a hydraulic fluid cooler, is not prone to plugging, and does not require additional air flow systems to provide separate cooling air.

An auxiliary hydraulic circuit, which may include a lift cylinder, may be connected between the pair of integrated hydrostatic transmissions. Hydraulic fluid flows through the auxiliary hydraulic circuit from one integrated hydrostatic transmission to the other integrated hydrostatic transmission.

DESCRIPTION OF THE PREFERRED EMBODIMENT

Figure 1:
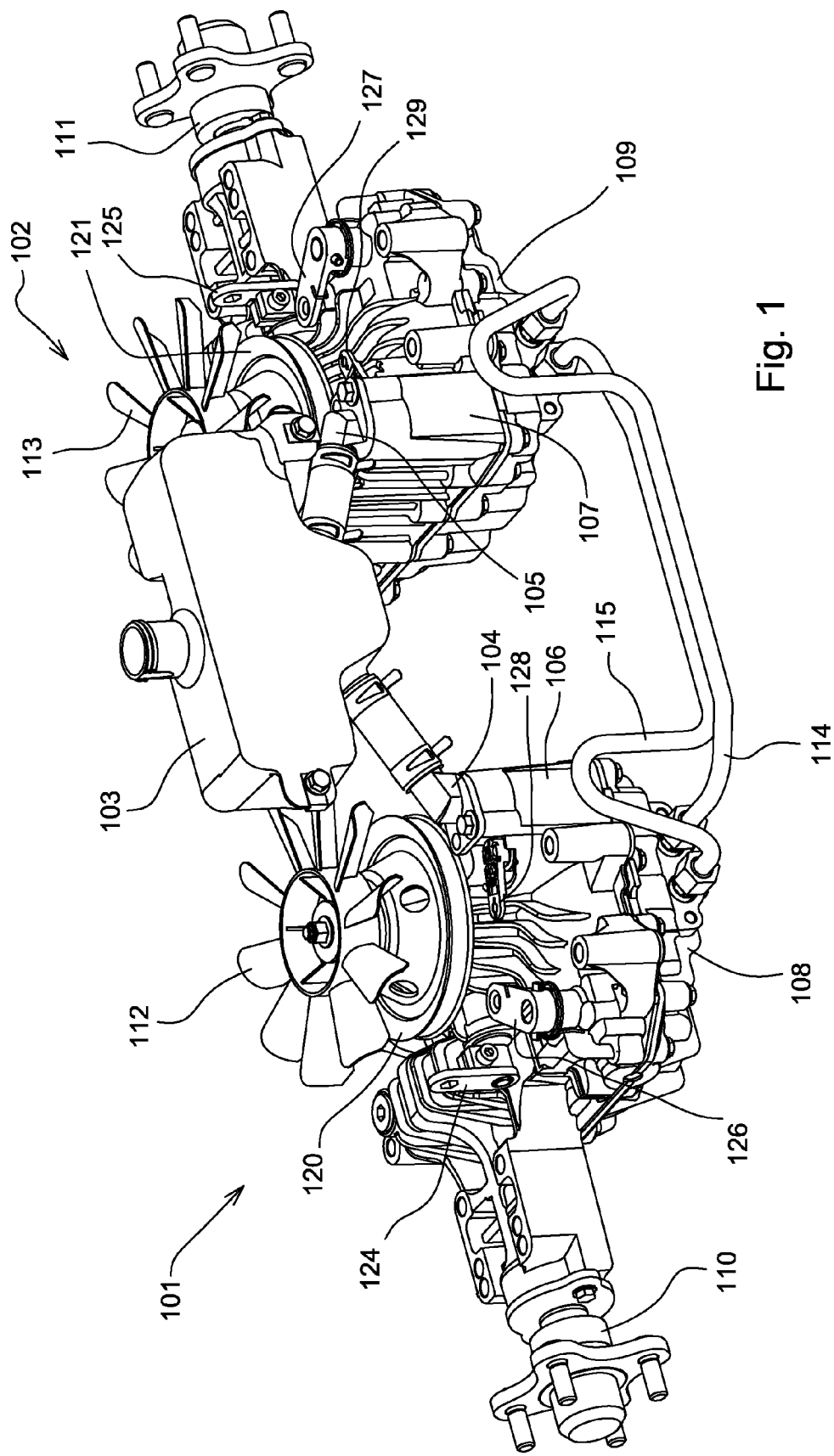
FIG. 1 is a perspective view of a pair of integrated hydrostatic transmissions with a hydraulic fluid cooling system according to a first embodiment of the invention.

The auxiliary hydraulic circuit of the present invention may be used with a pair of integrated hydrostatic transmissions on a zero turning radius ("ZTR") mower. A ZTR mower has a drive wheel on each side that is independently powered to rotate independently of the other drive wheel. Each of the left and right drive wheels have an integrated hydrostatic transmission 101, 102 to transmit power from an internal combustion engine or other power source to an independent wheel motor. The left and right integrated hydrostatic transmissions 101, 102 may be housed in upper casings 106, 107 attached to lower casings 108, 109. The upper and/or lower casings may have cooling fins to help dissipate heat generated by the transmission during operation.

Each integrated hydrostatic transmission may be a closed loop system with a variable displacement reversible pump 132, 133 driven by pump input shaft powered by an internal combustion engine, which provides pressurized flow of hydraulic fluid through fluid lines to a fixed displacement motor 146, 147 that rotates an output shaft or axle 110, 111 for a traction drive wheel. Each pump provides fluid to a motor through either a forward line or reverse line, while the other line serves as a return line. For example, the pump displacement may be variable between 0 and 13.3 cc/revolution and may be driven by an internal combustion engine or other power source. The fixed displacement motor may have a speed proportional to the 0-13.3 cc/revolution flow from the pump.

Figure 2:
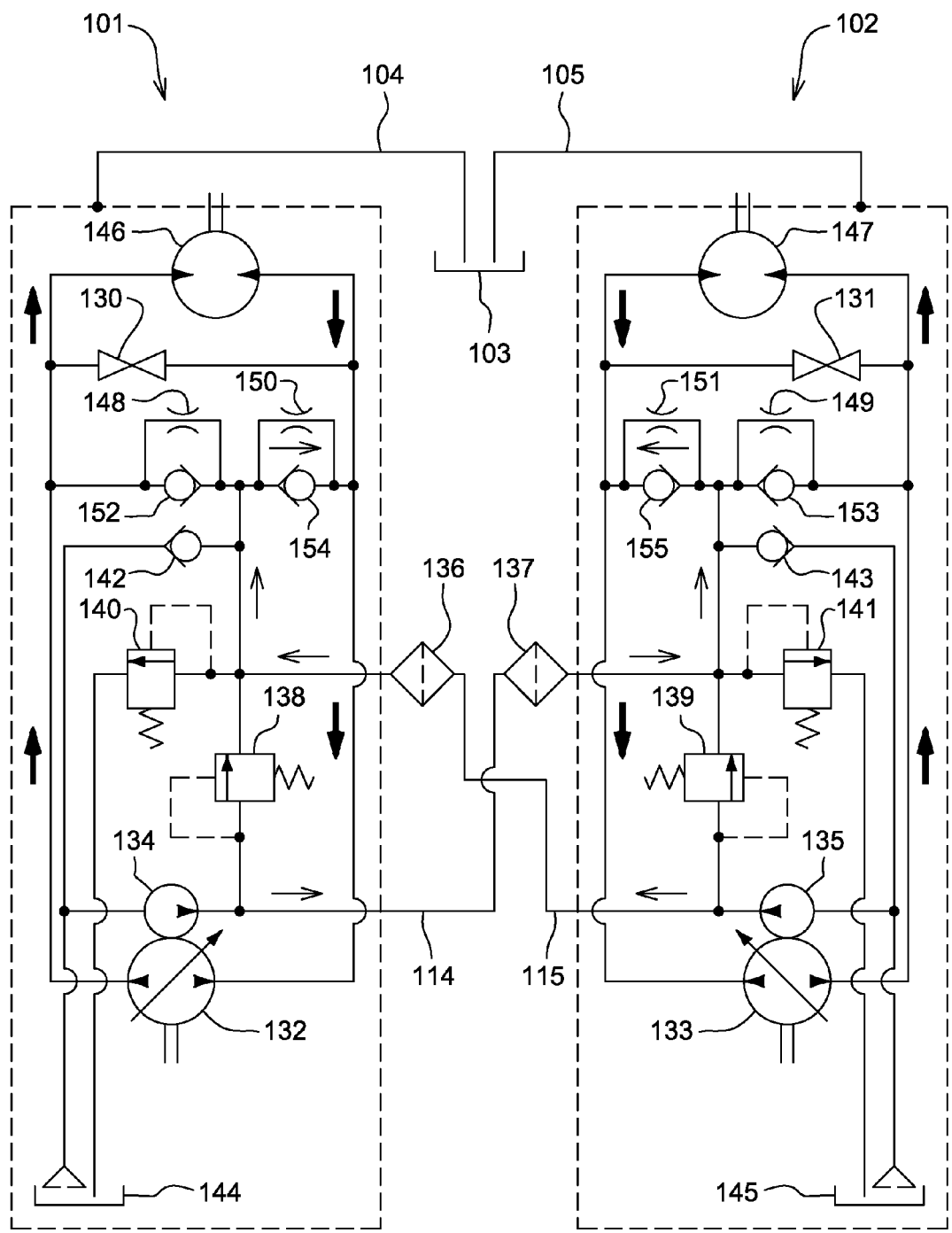
FIG. 2 is a schematic diagram of a hydraulic fluid cooling system for a pair of integrated hydrostatic transmissions according to the first embodiment.

FIG. 2 is a schematic of a first embodiment of the hydraulic fluid cooling system. The bold arrows show the closed loop flow of hydraulic fluid between each variable displacement pump 132, 133 and hydraulic motor 146, 147, while each steering control and trunion arm 124, 125 operates an integrated hydrostatic transmission in the forward direction. If the steering controls and trunion arms of the transmissions were reversed to operate the transmissions in the reverse direction, the flow of hydraulic fluid would be reversed and the bold arrows point in the opposite direction.

A common hydraulic fluid reservoir or tank 103 provides hydraulic fluid through the upper casings 106, 107 into both integrated hydrostatic transmissions 101, 102. Hydraulic lines 104, 105 including fittings or connectors connect the common reservoir 103 to the upper casings of each transmission.

An internal combustion engine or other power source may drive each pump through a belt driven pulley 120, 121 mounted on a shaft extending through each upper casing. A cooling fan 112, 113 also may be mounted on each shaft above the pulley. Each integrated hydrostatic transmission may have a swash plate to define a pump stroke between a neutral position, a full forward position, and a full reverse position. An operator may use steering controls connected to trunion arms 124, 125 to pivot the swash plates for driving and steering the vehicle.

Additionally, each integrated hydrostatic transmission 101, 102 may have a brake trunion arm 126, 127. The brake trunion arm may provide a parking brake from the motor to the axle wheel hub, and may engage the motor shaft, axle shaft or reduction shaft.

Each integrated hydrostatic transmission may include a positive displacement charge pump 134, 135 to make up fluid losses from the closed loop through internal leakage. Each charge pump may have a smaller capacity than pumps 132, 133, to provide makeup flow of hydraulic fluid from each sump. Each charge pump may be driven by the internal combustion engine or other power source, and may provide pressurized flow of hydraulic fluid from the sump or reservoir 144, 145 in each casing, and may have a displacement of 4.125 cc/revolution, for example.

In the first embodiment, the flow of charge fluid from each charge pump 134, 135 is indicated by the light arrows in FIG. 2. In this embodiment, the charge fluid is from an outlet of each charge pump 134, 135 through a hydraulic line or hose 114, 115 to an inlet to the other integrated hydrostatic transmission. The pair of hydraulic lines or hoses connecting between the pair of integrated hydrostatic transmissions may direct hydraulic fluid from one transmission to be used for charge fluid in the other transmission. Optionally, a screen or filter 136, 137 may be provided in each hydraulic line 114, 115 between the pair of integrated hydrostatic transmissions. Optionally, each hydraulic line 114, 115 may have a flex point to allow the integrated hydrostatic transmissions to move relative to each other.

In the first embodiment, once charge fluid from charge pumps 134, 135 is directed through hydraulic lines 114, 115 to the other hydrostatic transmission, the charge fluid then may be directed through check valves and orifices to reach the low pressure side of a hydraulic motor 146, 147. If each integrated hydrostatic transmission is in forward, as shown in FIG. 2, the charge fluid flow is primarily through check valves 154, 155 and orifices 150, 151. If the transmission is in reverse, the charge fluid flow is primarily through check valves 152, 153 and orifices 148, 149.

Each integrated hydrostatic transmission may include a charge pump relief valve 140, 141 so that if hydraulic fluid pressure from the charge pump exceeds a predetermined pressure such as 0.25 MPa, the charge pump relief valve opens to send charge fluid to sump or reservoir 144, 145 in each transmission.

Additionally, each integrated hydrostatic transmission may include a bypass valve 130, 131 which may be controlled by trunions 128, 129 to direct charge fluid flow around the hydraulic motor.

Each integrated hydrostatic transmission optionally may include an implement relief valve 138, 139 so that if the line from the charge pump to the other transmission is blocked and the charge fluid pressure exceeds a predetermined pressure such as 4.5 MPa, the implement relief valve opens to send charge fluid from the charge pump to join the charge flow in the same transmission, or directly to the sump if charge flow needs of the loops are met.

Check valves 142, 143 may be provided in hydraulic lines connected to the sump or reservoir 144, 145 of each integrated hydrostatic transmission. Check valves 142, 143 allow hydraulic fluid to flow around the charge pump when the engine is off, so that the loops remain charged with hydraulic fluid and can resist rolling downhill on a slope.

Figure 3:
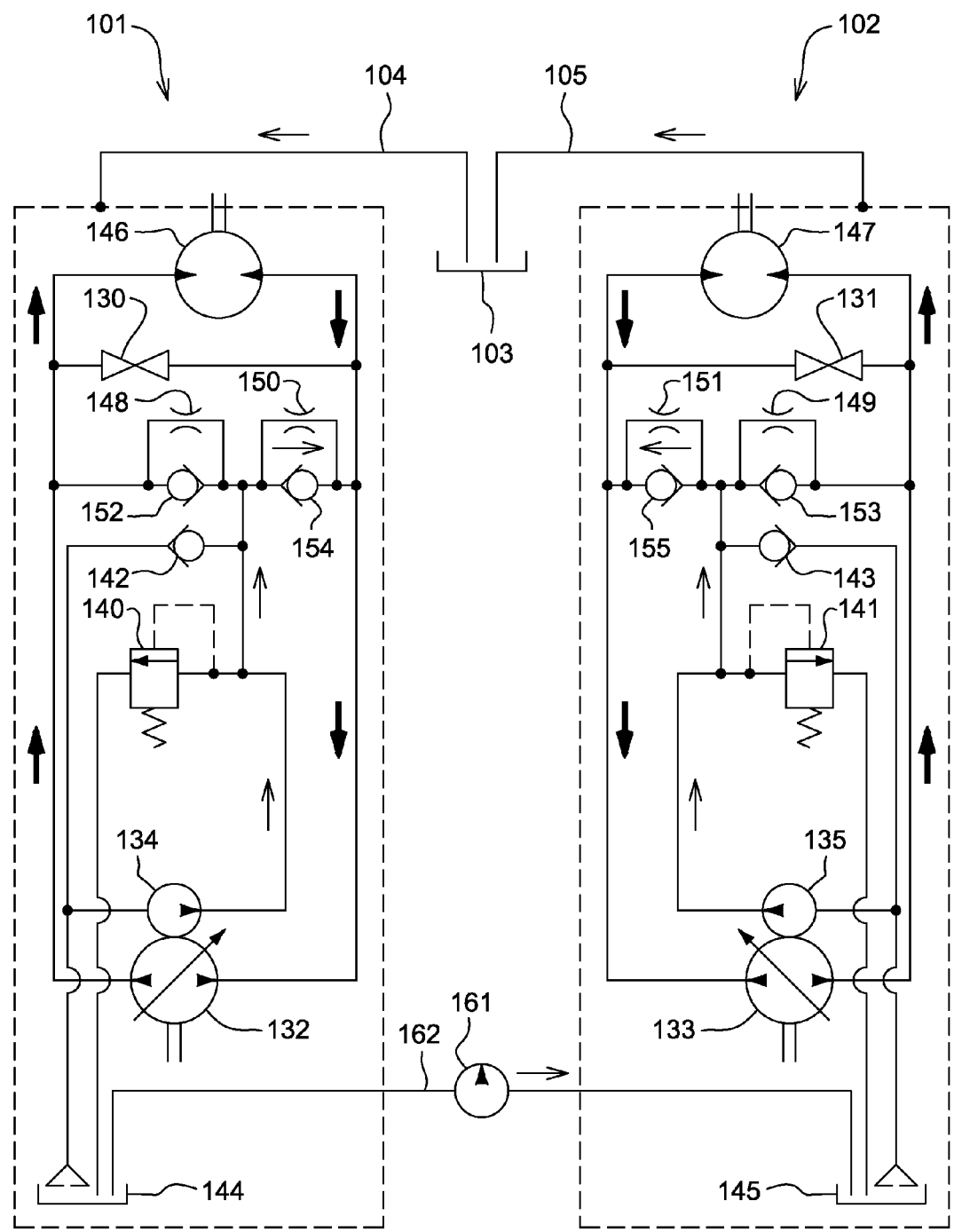
FIG. 3 is a schematic diagram of a hydraulic fluid cooling system for a pair of integrated hydrostatic transmissions according to a second embodiment.
Figure 4:
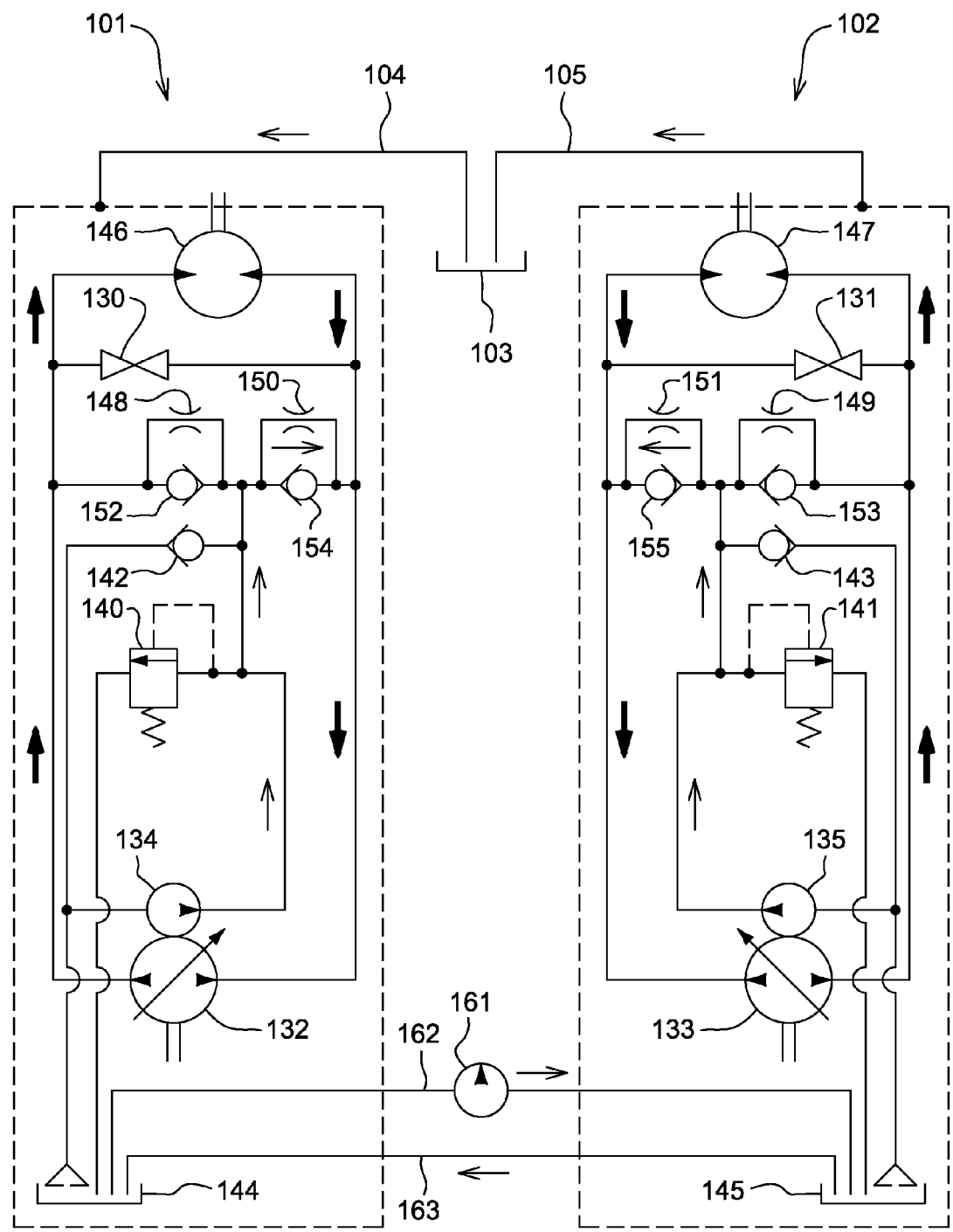
FIG. 4 is a schematic diagram of a hydraulic fluid cooling system for a pair of integrated hydrostatic transmissions according to a third embodiment.

In a second embodiment of the invention shown in FIG. 3, remote pump 161 is provided in hydraulic line 162 connecting between the pair of integrated hydrostatic transmissions. For example, the remote pump may be a positive displacement electric pump to direct flow of hydraulic fluid from the sump or reservoir of each integrated hydrostatic transmission through the hydraulic line to the sump of the other transmission. In this embodiment, return flow may be through lines 104, 105 via common reservoir 103. Alternatively, according to a third embodiment shown in FIG. 4, return flow may be through hydraulic line 163 connecting between the sumps or reservoirs 145, 146 of the pair of integrated hydrostatic transmissions.

Figure 5:
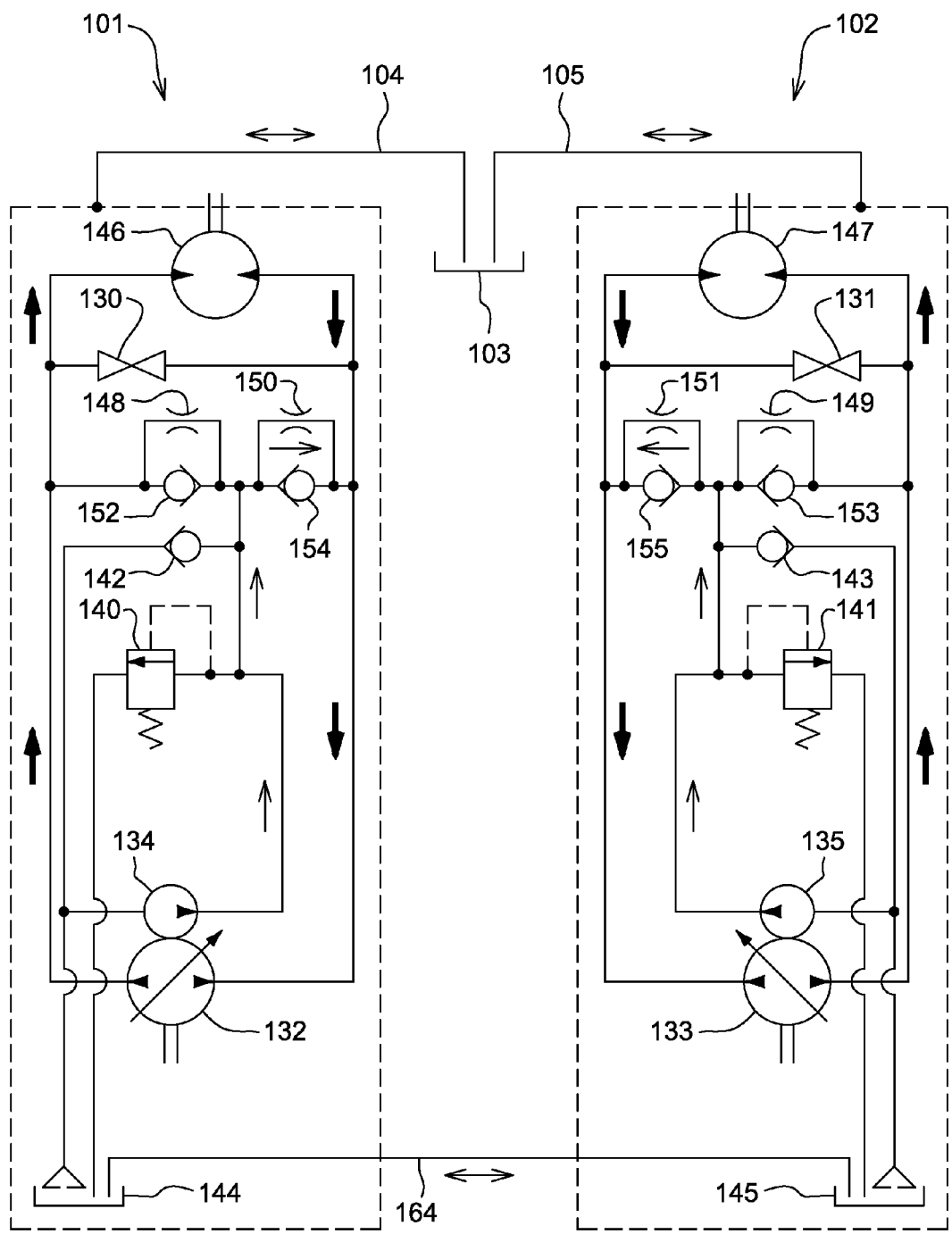
FIG. 5 is a schematic diagram of a hydraulic fluid cooling system for a pair of integrated hydrostatic transmissions according to a fourth embodiment.

In a fourth embodiment shown in FIG. 5, hydraulic line 164 is provided to link between the sumps or reservoirs 144, 145 of the pair of integrated hydrostatic transmissions, without a separate pump. Instead, the fourth embodiment functions as a natural heat pump to circulate hydraulic fluid between the pair of integrated hydrostatic transmissions when there is a temperature difference in the hydraulic fluid. Additionally, hydraulic fluid may be returned through lines 104, 105 connecting common reservoir 103 to the pair of integrated hydrostatic transmissions.

By pumping hydraulic fluid from the sump or reservoir of each integrated hydrostatic transmission to the other transmission, the hydraulic fluid cooling system of this invention provides the cooling capacity of a non-loaded transmission to cool hydraulic fluid for a fully loaded transmission. The system is low cost because it does not require use of a hydraulic fluid cooler. Additionally, the system is not prone to plugging as are many coolers, and does not require additional air flow systems to provide separate cooling air.

Figure 6:
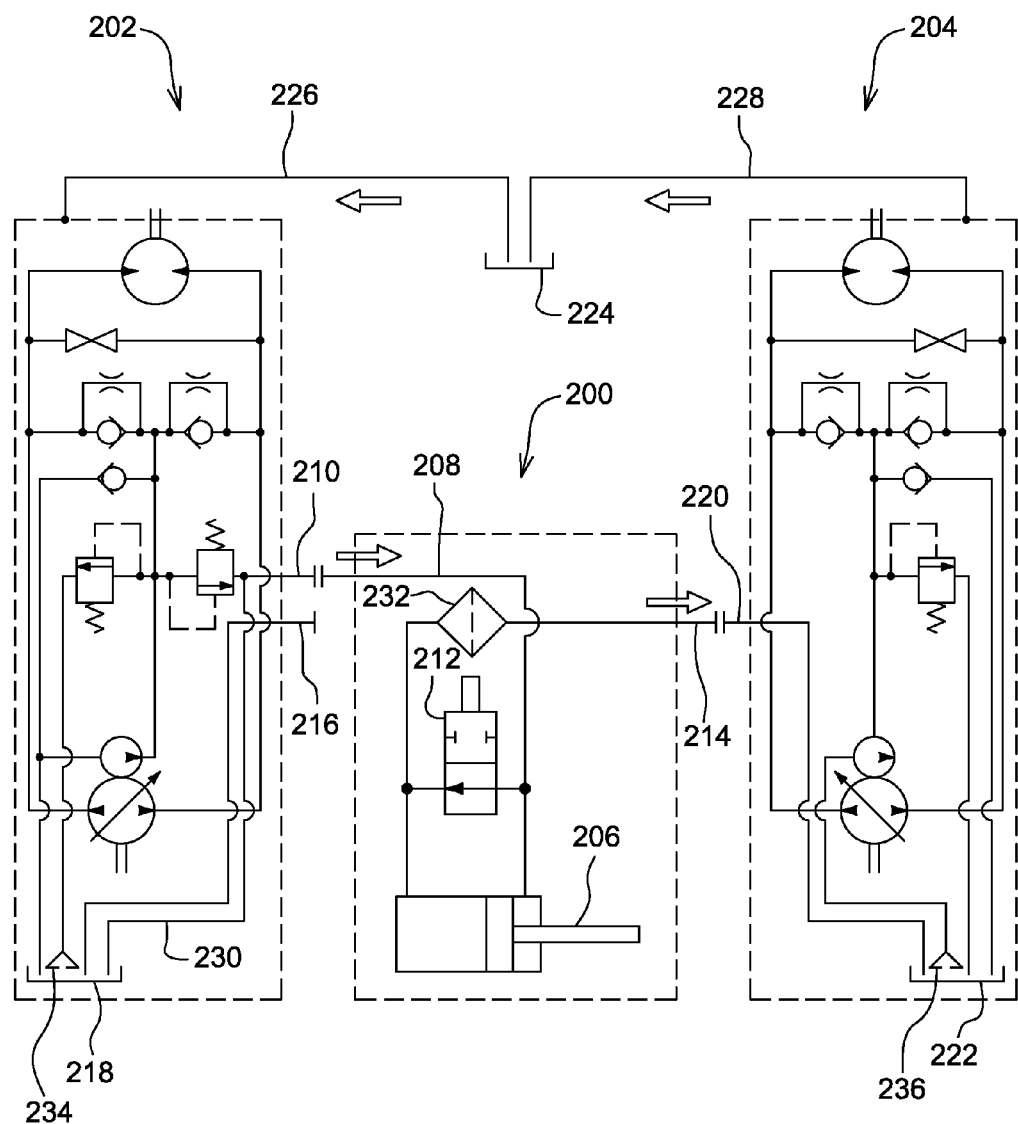
FIG. 6 is a schematic diagram of a hydraulic fluid cooling system for a pair of integrated hydrostatic transmissions with an auxiliary hydraulic circuit according to a fifth embodiment.

In a fifth embodiment shown in FIG. 6, auxiliary hydraulic circuit 200 may be connected between pair of integrated hydrostatic transmissions 202, 204. The auxiliary hydraulic circuit, for example, may be an optional, remote, external hydraulic system that includes lift cylinder 206 for raising and lowering a mower deck or other mechanism. The auxiliary hydraulic system may be used in a system for sharing and cooling of hydraulic fluid between a pair of integrated hydrostatic transmissions, and does not require an additional return line filter to protect each hydrostatic transmission from contaminations to hydraulic fluid.

In the embodiment of FIG. 6, hydraulic output line 208 may be connected between outlet 210 of integrated hydrostatic transmission 202 and auxiliary hydraulic circuit 200. If hydraulic fluid is directed out through outlet 210 to hydraulic output line 208, internal return line 230 may be inactive or closed. Hydraulic output line 208 may provide high pressure hydraulic fluid from integrated hydrostatic transmission 202 to the auxiliary hydraulic circuit. The auxiliary hydraulic circuit may include SCV valve 212. The SCV valve may be a spool valve actuatable by the operator to at least a first position to raise the lift cylinder and a second position to lower the lift cylinder.

In one embodiment, hydraulic fluid may return from auxiliary hydraulic circuit 200 to integrated hydrostatic transmission 202 through hydraulic return line 214. Hydraulic return line 214 may be connected to return inlet 216 of integrated hydrostatic transmission 202, which may direct flow of hydraulic fluid to sump or reservoir 218. Alternatively, hydraulic fluid may be returned from auxiliary hydraulic circuit 200 to integrated hydrostatic transmission 202 by connecting hydraulic return line 214 to return inlet 220 of integrated hydrostatic transmission 204. Return inlet 220 may direct flow of hydraulic fluid to sump or reservoir 222. Alternatively, return line 214 may be connected to both return inlets 216 and 220 with a T fitting.

In one embodiment, common hydraulic fluid reservoir or tank 224 may provide hydraulic fluid from integrated hydrostatic transmission 204 to integrated hydrostatic transmission 202. Hydraulic lines 226, 228 may connect the common reservoir 224 to the upper casings of each integrated hydrostatic transmission. As a result, cooling may be accomplished by sharing and mixing of hydraulic fluid among the pair of transmissions through the lines to the common reservoir.

In one embodiment, if the auxiliary hydraulic circuit is not in use, hydraulic output line 208 may be disconnected from outlet 210 of integrated hydrostatic transmission 202, and a replaceable discharge plug (not shown) may be plugged into the outlet. Additionally, if the auxiliary hydraulic circuit is not in use, internal return line 230 in integrated hydrostatic transmission 202 may become active while the discharge plug is in outlet 210, so that internal return line 230 can return hydraulic fluid to sump or reservoir 218. Similarly, if the auxiliary hydraulic circuit is not in use, the hydraulic return line may be disconnected from the inlet of either integrated hydrostatic transmission 202 or 204, and a replaceable discharge plug may be plugged into the inlet.

In one embodiment, the auxiliary hydraulic circuit may include filter 232. Alternatively, each integrated hydrostatic transmission 202, 204 includes an internal filter 234, 236 for cleaning hydraulic fluid from the sump, and no additional filter is required or needed in the auxiliary hydraulic circuit.

Having described the preferred embodiment, it will become apparent that various modifications can be made without departing from the scope of the invention as defined in the accompanying claims.

The invention claimed is:

1. A hydraulic fluid cooling system for a pair of integrated hydrostatic transmissions, comprising:
   fluid lines connecting a common reservoir between the pair of integrated hydrostatic transmissions; and
   an auxiliary hydraulic circuit connected between a sump of each of the pair of integrated hydrostatic transmissions; the auxiliary hydraulic circuit including an operator actuatable valve and a lift cylinder to raise and lower a mower deck such that hydraulic fluid flows through the auxiliary hydraulic circuit from one integrated hydrostatic transmission to the other integrated hydrostatic transmission without a hydraulic fluid cooler.

2. A hydraulic fluid cooling system for a pair of integrated hydrostatic transmissions, comprising:
   a common reservoir holding hydraulic fluid and having hydraulic lines connecting the common reservoir to each integrated hydrostatic transmission;
   a hydraulic fluid reservoir inside each of the pair of integrated hydrostatic transmission;
   a pump for pumping fluid from one of the transmission's hydraulic fluid reservoir through an auxiliary hydraulic circuit to the other transmission;
   the auxiliary hydraulic circuit having an operator actuatable valve and a lift cylinder to raise and lower a mower deck absent any hydraulic fluid cooling radiator.

3. The hydraulic fluid cooling system of claim 2 wherein the lift cylinder is actuated by a spool valve.

4. The hydraulic fluid cooling system of claim 3 wherein the pump is positive displacement charge pump.

5. A method for cooling hydraulic fluid in a first integrated hydrostatic transmission and a second integrated hydrostatic transmission, comprising:
   connecting a common reservoir of hydraulic fluid to both integrated hydrostatic transmissions;
   pumping hydraulic fluid through a first fluid line from a sump of the first hydrostatic transmission to an auxiliary hydraulic circuit;
   returning hydraulic fluid from the auxiliary hydraulic circuit to a sump of the second integrated hydrostatic transmission;
   the common reservoir and auxiliary hydraulic circuit providing hydraulic fluid cooling by moving hydraulic fluid between the first and the second hydrostatic transmissions without a radiator.

6. The method for cooling hydraulic fluid of claim 5 further comprising filtering the hydraulic fluid in the first fluid line.

7. The method for cooling hydraulic fluid of claim 5 further comprising pumping hydraulic fluid with a positive displacement charge pump in each integrated hydrostatic transmission.

* * * * *